United States Patent [19]

Watson

[11] 4,142,590

[45] Mar. 6, 1979

[54] LUBRICATING SYSTEM FOR PLOW BLADES

[75] Inventor: William R. Watson, Burbank, Ill.

[73] Assignee: Nalco Chemical Company, Oakbrook, Ill.

[21] Appl. No.: 785,833

[22] Filed: Apr. 8, 1977

Related U.S. Application Data

[63] Continuation-in-part of Ser. No. 687,984, May 19, 1976, Pat. No. 4,068,725.

[51] Int. Cl.² .............................................. A01B 15/00
[52] U.S. Cl. ..................................... 172/755; 184/7 E; 172/1; 172/747
[58] Field of Search ........................... 172/1, 747, 755; 184/7 R, 7 C, 7 CR, 7 D, 7 E, 7 F

[56] References Cited

U.S. PATENT DOCUMENTS

| 194,231 | 8/1877 | English | 172/755 |
|---|---|---|---|
| 1,805,303 | 5/1931 | Barks | 184/7 R |
| 1,897,444 | 2/1933 | Stark | 172/755 |
| 3,145,803 | 8/1964 | Cobert | 184/7 D |
| 3,418,157 | 12/1968 | Katzer | 172/747 X |
| 3,527,322 | 9/1970 | Roberts | 184/7 E X |
| 3,685,592 | 8/1972 | Frisbee | 172/755 X |

FOREIGN PATENT DOCUMENTS

| 713944 | 8/1931 | France | 172/755 |
|---|---|---|---|
| 1416164 | 12/1975 | United Kingdom | 172/755 |
| 234770 | 1/1969 | U.S.S.R. | 172/755 |

*Primary Examiner*—Paul E. Shapiro
*Attorney, Agent, or Firm*—Hill, Gross, Simpson, Van Santen, Steadman, Chiara & Simpson

[57] ABSTRACT

A lubricating system for plow blades has a plurality of tube outlets positioned near a bottom portion of a plow blade and aligned to expel a dilute polymer lubricating fluid upward and onto a surface of the plow blade. As the plow blade scrapes up ground material, the scrapings distribute the lubricating fluid over the surface of the plow blade. Each of the tube outlets is supplied with lubricating fluid from a storage container via a pump connected to a positive displacement distribution block. In a farm plow system having eight separate plowshares, four positive displacement distribution blocks and one master distribution block are employed to supply lubricating fluid to twenty tube outlets.

8 Claims, 8 Drawing Figures

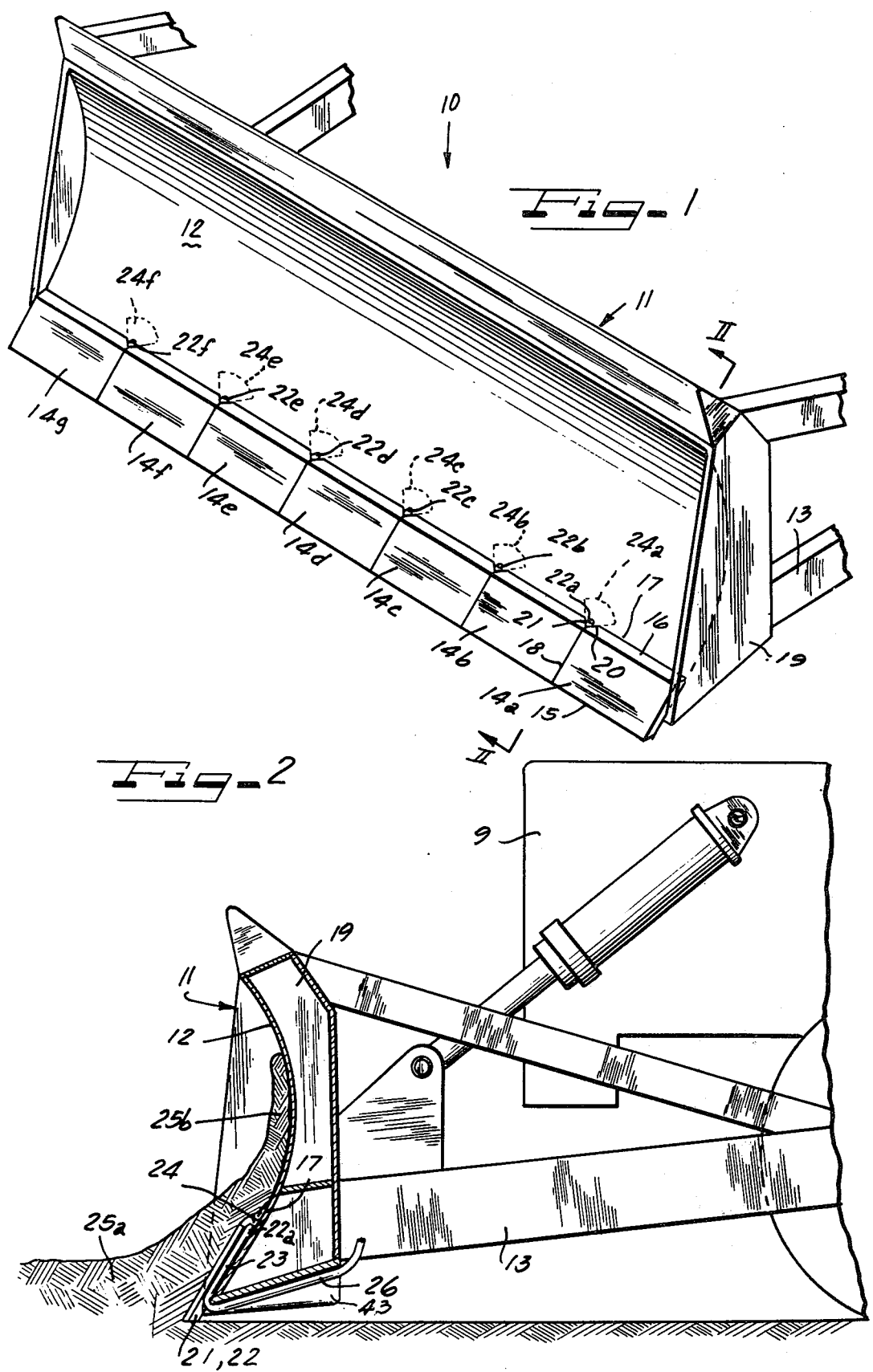

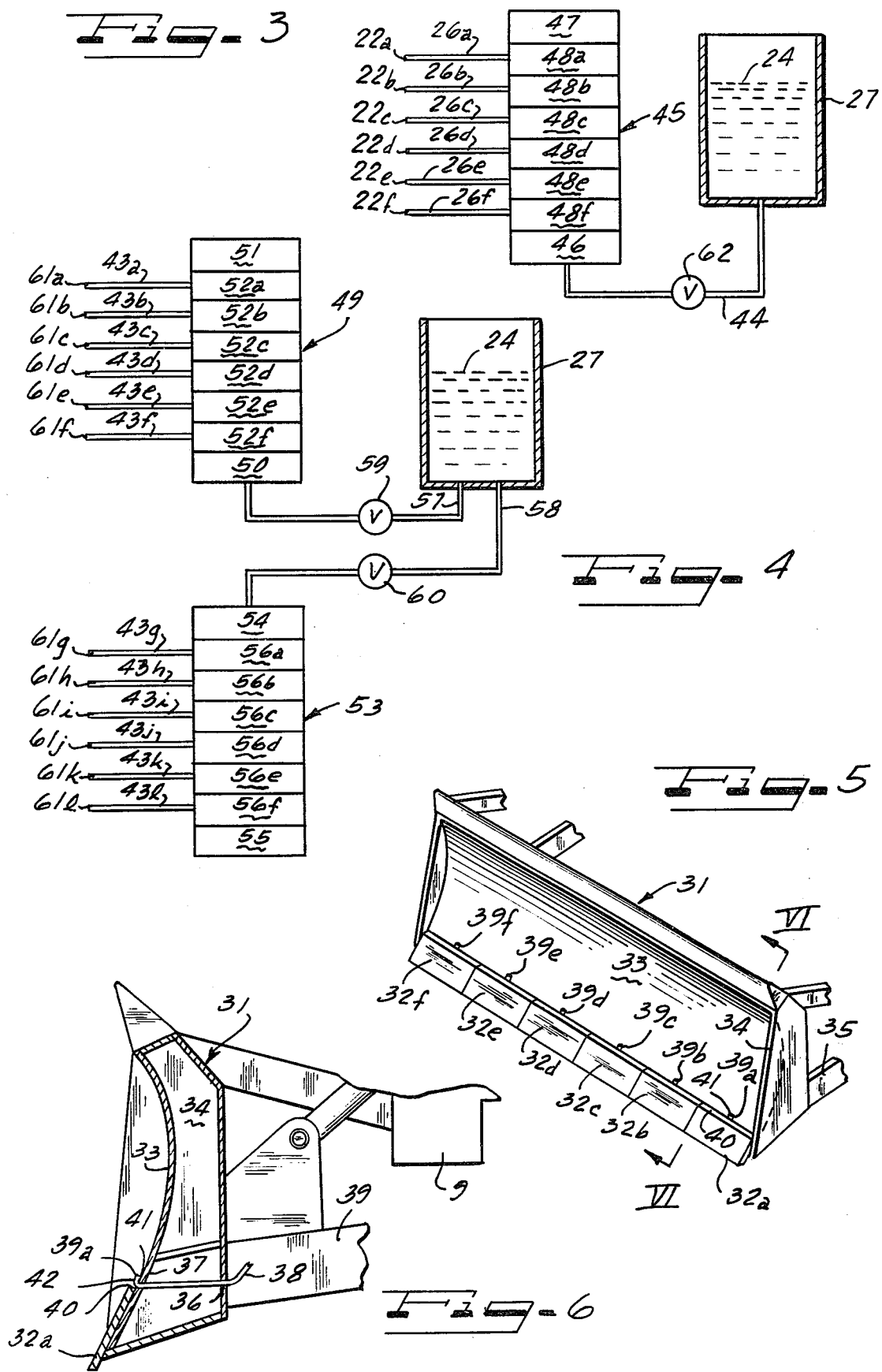

2

LUBRICATING SYSTEM FOR PLOW BLADES

RELATED APPLICATIONS

This is a continuation-in-part of my co-pending application U.S. Ser. No. 687,984, filed May 19, 1976 now U.S. Pat. No. 4,068,725, and assigned to the same assignee.

BACKGROUND OF THE INVENTION

1. Field of the Invention

This invention relates to a lubricating system and more particularly to a lubricating system for plow blades.

2. Description of the Prior Art

In U.S. Pat. No. 3,418,157 to Katzer the use of dilute polymer lubricating agents is discussed for lubricating earth contacting surfaces such as earth working tools. By applying the dilute polymer lubricant to the surfaces, clayey earth does not stick to the surface as easily.

The use of bulldozer blades of large dimensions, such as a blade having a width of 40 feet or greater, has become increasingly popular for land reclamation projects since the cost of earth moving can be reduced with such large blades. It is desirable to improve the operating efficiency of such blades to further reduce cost.

SUMMARY OF THE INVENTION

It is an object of this invention to increase the efficiency of large plow blades by application of lubricating fluid to a plurality of positions on a surface of the blade through an efficient fluid distribution system which utilizes a minimum number of discrete pumps.

It is a further object of this invention to provide a lubricating system for a plow blade in which the ground material scraped up by the plow blade acts to distribute lubricating fluid expelled onto a surface of the blade at a plurality of positions.

In accordance with the present invention, a plurality of tube outlets are located adjacent an upper edge of a cutting plate mounted at a bottom portion of a blade surface on a large plow blade. The tube outlets are aligned to expel lubricating fluid upward and parallel to adjacent portions of the blade surface. Feed tubes or lines connected to each of the tube outlets convey lubricating fluid from the storage container. A pump is connected to the storage container and a positive displacement distribution block connected to the pump provides separate pressure drive for delivering lubricating fluid to each of the tube outlets. As the cutting edge of the plow blade scrapes along the ground, the scraped up ground material compacts against portions of the blade which are wetted with the lubricating fluid. As the scraping continues, the scraped up material is distributed across the blade surface and carries with it the lubricating fluid for even distribution over the surface of the blade.

BRIEF DESCRIPTION OF THE DRAWINGS

FIG. 1 is a perspective view of a plow blade lubricated with the system of this invention;

FIG. 2 is a cross-sectional view taken along line II—II of FIG. 1;

FIGS. 3 and 4 are a schematic diagram of the lubricating fluid distribution system of this invention;

FIG. 5 is a perspective view of another embodiment of a plow blade lubricated with the system of this invention;

FIG. 6 is a cross-sectional view taken along line V—V of FIG. 4;

DESCRIPTION OF THE PREFERRED EMBODIMENTS

Figure 7:
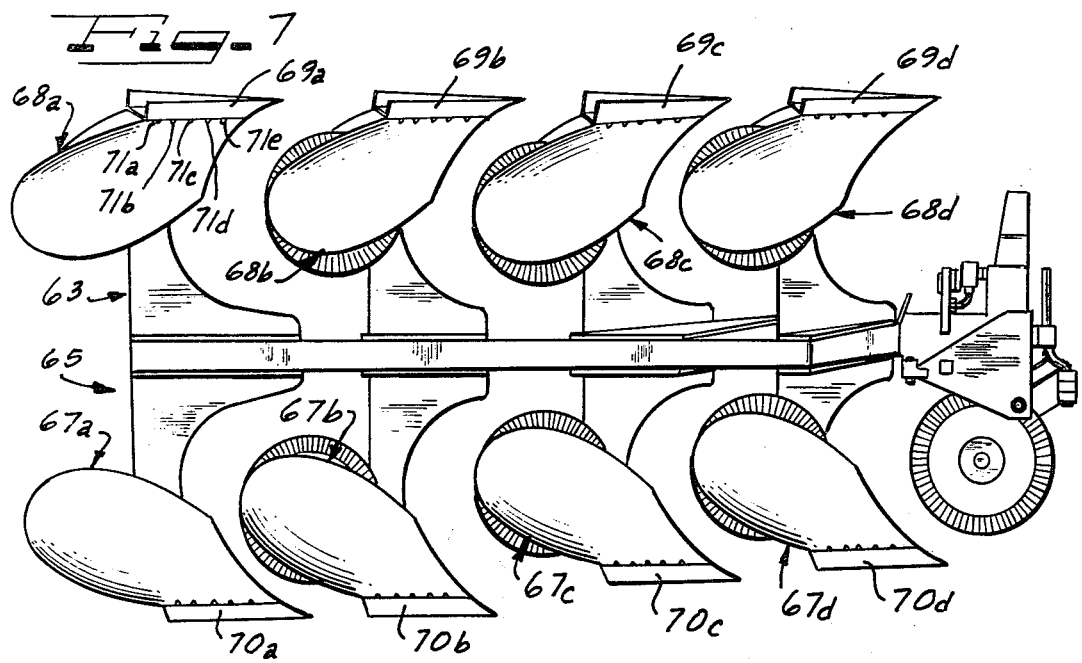
FIG. 7 is a side view of a reversible plowshare system having each plowshare lubricated with the system of this invention.

A plow blade lubricated according to this invention is generally shown at 10 in FIG. 1. A tractor or bulldozer 9 has a plow blade 11 connected thereto by mounting arm or arms 13. The blade 11 has an arcuate blade face 12 and a plurality of cutting plates 14a–g mounted along the lower portion of the blade face 12. Each of these cutting blades has a lower portion functioning as a cutting edge 15 and a flat top edge portion 16 which creates an offset with respect to the blade face or surface 12. This offset creates a shadowed or protected area 17, most clearly shown in FIG. 2, adjacent the top edge 16 such that when ground scrapings flow over the cutting plate they do not exert large pressures in the shadow of the offset.

Cutting blades which abut one another (14a and 14b, for example) form joints 18. Notches or bevelled portions 20 and 21 such as in abutting cutting plates 14a and 14b form a V-shaped opening between adjacent cutting blades. Pipe or tube outlets 22a–f are aligned within each of the V-shaped portions between abutting cutting plates. These pipe outlets are aligned to be parallel with adjacent portions of the blade face. Consequently, when a tube 23 connected to the outlet 22a–f conveys lubricating fluid, portions 24a–f wetted by lubricating fluid 24 are formed adjacent and above the outlets 22a–f.

Although it is not required, nozzles may be placed at the tube outlets 22a–f for expelling the lubricating fluid 24.

As shown most clearly in FIG. 2, as the blade 11 moves along the ground 25a, ground material 25b is scraped up which moves along the blade surface 12 and spreads the lubricating fluid 24 over the face of the blade.

Feed tubes 26a–f shown in FIG. 3 connect via tube bent portions 23 to each of the tube outlets 22a–f. These feed tubes connect with a positive displacement distributor block 45. Such a distributor block typically has an inlet section 46, an end section 47, and intermediate sections such as 48a–f. The intermediate sections connect with the feed tubes 26a–f to supply lubricating fluid under positive pressure to the tube outlets 22a–f. With such a system, only a single pump 62 may be connected between the inlet section 46 of the block 45 and the storage tank 27 containing the lubricating fluid 24.

A commercially available distributor block useful for the system of this invention is the "series-flow" feeder (a registered trademark of Houdaille Industries, Inc.). Such a feeder operates progressively or sequentially such that a measured amount of lubricant is discharged into the feed tubes 26a–f in sequential fashion. As long as lubricant is supplied under pressure to the inlet section of the feeder, the intermediate sections will continue to operate in a progressive or sequential manner. Since each intermediate section has its own piston chamber, the portion of lubricant fed to each of the feed tubes 26a-f is under a positive pressure which is independent from the other feed tubes. The importance of this feature is discussed below.

FIG. 4 illustrates an alternate embodiment of the lubricating fluid feed system of FIG. 3. In the system of FIG. 4, two distributor blocks 49 and 53 are provided, each of which is independently fed by a separate pump 59 or 60 connected to a storage tank 27 via feed lines 57 or 58. With such an arrangement, the number of feed tubes and tube outlets may be doubled. In this embodiment, feed tubes 43a-f respectively connect with intermediate sections 52a-f of the distributor block 49, and an end section 51 and an inlet section 50 are provided as previously described. The other distributor block 53 has additional feed tubes 43g-l respectively connected to intermediate sections 56a-f. Again, an inlet section 54 and an end section 55 are provided. With such a system, a total of twelve outlets 61a-l can expel lubricating fluid under positive pressure. As described for the embodiment of FIG. 3, the distributor blocks 49 or 53 permit independent positive pressure to be applied in each of the feed tubes which is independent of the pressures in the other feed tubes.

Each of the feed tubes 26a-f are protected below the plow blade 11 by ridges 43 between which the feed tubes 26a-f are aligned.

The lubricating fluid 24 is preferably a dilute polymer having water as the principal diluting agent. High molecular weight acrylic polymers offer substantial lubricating properties even in high dilutions. As little as 1% or 2% of polymer in solution is needed to provide substantial lubricating qualities.

Another embodiment of the plow blade is shown in FIGS. 4 and 5. A blade 31 is again shown having cutting plates 32a-f mounted along a bottom portion thereof. A blade face 33 has a reinforcement portion 34 which is mounted by mounting means 35 to a tractor. Apertures 36 in the reinforcement portion 34 and aperture 39 in the blade face 33 are provided adjacent an upper edge 40 of the cutting plates 32a-f for each tube outlet 39a-f. A feed pipe 38 is inserted through these apertures. Aperture 37 in the blade face 33 permits each of the feed pipes 38 to connect with the tube outlets 39a-f. Each of the outlets 39a-f is aligned by a bent tube portion 42 to project upwardly and parallel with the blade surface 33. This outlet lies well within a protected area 41 formed by the offset between the exposed surface of the cutting plate 32 and the blade surface or face 33. In this embodiment, the tube outlets 39a-f are exposed and consequently installation of various nozzle designs is most convenient in this embodiment.

OPERATION

As shown most clearly in FIG. 2, as the blade scrapes along the ground 25a, ground material 25b is scraped up and slides upward and laterally across the blade. Since the lubricating fluid injection points are located near the bottom of the blade, as the scraped up dirt catches the fluid 24, it is evenly spread across the entire blade. Consequently, large fluid injection pressures are not needed.

An important element of this invention is the design step taken to prevent clogging of each of the individual injection points. Since each tube outlet is fed with lubricating fluid under an independent positive pressure, clogging of one outlet will not have an appreciable effect on pressures of the other outlets. Furthermore, the clogged outlet will have a positive displacement pressure applied to it whenever the distributor block attempts to deliver a portion of lubricating fluid. By use of the distributor blocks such as 45 or 49 and 53, the need for separate pumps for each tube outlet is eliminated. Only a single pump is needed for delivering lubricating fluid to a given distributor block. Furthermore, by locating the fluid injection tube outlets in a protected area (17 in FIGS. 2 and 41 in FIG. 5), clogging is minimized. As shown in FIG. 2, as earth scrapings 25b proceed over the cutting plate 14 and onto the plate surface 12, a low pressure pocket is created due to the offset levels of the cutting blade and main blade surface.

This invention is especially useful with large dimension plow blades. It should be understood, however, that the tube outlets of this invention may be designed to expel lubricating fluid onto other types of earth moving equipment.

Figure 8:
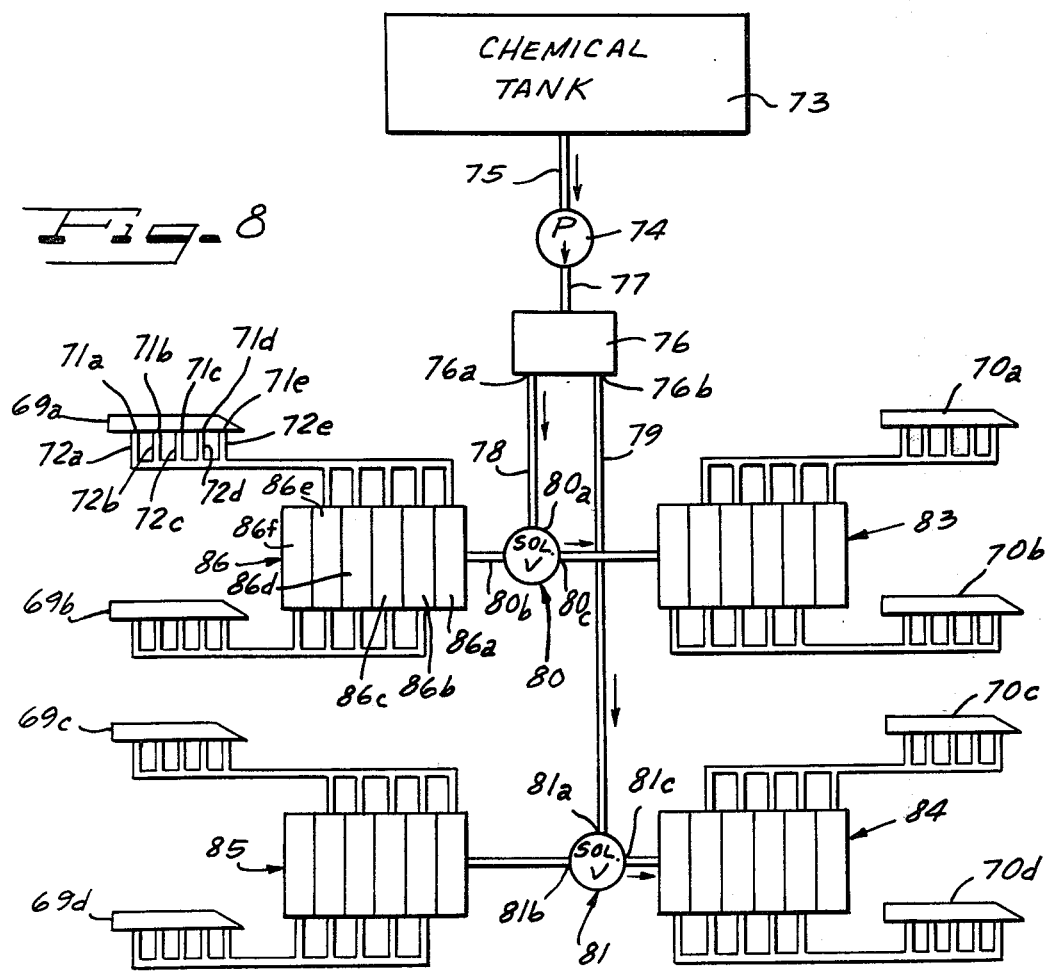
FIG. 8 is a schematic diagram of the lubricating fluid distribution system used in FIG. 7.

Another embodiment of the lubricating fluid distribution system of this invention is shown in FIGS. 7 and 8. A reversible plow system 63 may typically have eight plowshares or mold boards 67a-d and 68a-d. Plowshares 67a-d are mounted to a support 65 in a "down" position whereas plowshares 68a-d are mounted in an "up" position above the plowshares 67a-d. Since the pitch of the plowshares is reversed in the "down" position as compared to the "up" position, an operator of the system may place either group of plowshares into contact with the ground by rotating the appropriate group of plowshares into position. This permits the tractor operator to reverse his direction and plow a new adjacent row of furrows having a tilt or direction which is the same as a first row.

Each of the plowshares has a cutting blade 69a-d and 70a-d. Five tube outlets 71a-e mounted directly above the cutting blade such as 69a for plowshare 67a connect with feed tubes 72a-d to permit delivery of the lubricating polymer to the surface of the plowshares directly above the cutting edges.

As shown in FIG. 8, a chemical tank 73 is provided for carrying the lubricating polymer. A pump 74 connects with the chemical tanks 73 by a master feed line 75. A positive displacement distributor block 76 with two outlets 76a and 76b connect with the pump 74 through another master feed line 77. The distributor block 76 may typically comprise a six outlet distributor block having two pairs of outlets connected in series such that the block is converted to a single inlet with dual outlets.

A first feed line 78 and a second feed line 79 connecting to the outlets of the distributor block 76 feed the lubricating fluid to first and second solenoid valves 80 and 81. The valve 80 has an inlet 80a, a first outlet 80b and a second outlet 80c. Similarly, the second valve 81 has an inlet 81a, a first outlet 81b and a second outlet 81c. When the solenoid is on, the inlet 80a or 81a is connected with the second outlet 80c or 81c. When the solenoid is off, the inlet 80a or 81a connects with the first outlet 80b or 81b.

The first solenoid valve 80 has its inlet 88 connecting to the outlet 76a of the master distributor block 76. Outlet 80b connects with a first distributor block 82 and outlet 80c connects with a second distributor block 83. Inlet 81a of distributor block 81 connects with outlet 76b of the master distributor block 76. Outlet 81b connects with a third distributor block 85 and outlet 81c connects with a fourth distributor block 84. Each of these distributor blocks 82, 83, 84, and 85 are positive displacement distributor blocks as previously described except that in addition to the inlet section 86a and the intermediate sections 86b-f, each of the intermediate sections is provided with two outlets. Consequently, a single distributor block 82, 83, 84 or 85 provides a sequential flow to ten different tube outlets.

OPERATION

When the system is in operation, the plowshares 67a-d on the support 65 may, for example, be placed in contact with the ground. In this case, it is desired to feed lubricant to distributor blocks 83 and 84 so that fluid will be injected directly above the cutting edges 70a-d. Consequently, solenoids 80 and 81 are turned on to permit flow to each of the distributor blocks 83 and 84. Alternatively, when the plowshares 68a-d are rotated into contact with the ground, solenoids 80 and 81 are turned off so that lubricating fluid will flow to distributor blocks 82 and 85.

To stop all flow of lubricating fluid to the plowshares, it is necessary to shut off the main feed line pump 74.

For the above described application, it is desirable that five to ten gallons per acre of lubricating fluid be supplied to the plowshares. This translates into 50 to 250 cc per minute per plowshare.

For typical operation, a chemical tank of 25 to 150 gallons is provided. 960 cc per minute of fluid is supplied by the pump 74. This translates into 480 cc per minute per distribution block or 48 cc per minute per tube outlet.

For the above application, 1.25% or 6% polymer to water is an acceptable mixture.

Although various minor modifications may be suggested by those versed in the art, it should be understood that I wish to embody within the scope of the patent warranted thereon, all such embodiments as reasonably and properly come within the scope of my contribution to the art.

I claim as my invention:

1. A lubricating system for plow blades comprising:
   (a) a lubricating fluid storage container;
   (b) a plow blade having a blade surface and a cutting edge at a lower edge of said surface;
   (c) a plurality of tube outlets aligned to expel said lubricating fluid upward and onto said blade surface, said tube outlets being spaced along said cutting edge;
   (d) a pump connected to said storage container;
   (e) a positive displacement distribution block having an inlet connected to said pump and having outlets each supplying a positive flow of fluid not dependent on back pressure resistance;
   (f) a feed tube connecting each tube outlet to said distribution block so that positive flow will continue from each of the tube outlets during working engagement of the blade surface tending to block said tube outlets;
   (g) said cutting edge being formed by a lower edge of a cutting plate mounted to a lower portion of said blade surface, an offset being formed between said cutting plate and blade surface, said tube outlets being located along said offset to expel lubricating fluid upward from said offset; and
   (h) said cutting plate having notches cut to receive portions of the feed tubes which connect to said tube outlets, said tube outlets being located under and shielded by said cutting plate.

2. The system of claim 1 in which an additional positive displacement distribution block is provided which is connected to said storage container through another pump and additional tube outlets each being connected to said additional distribution block by additional feed tubes.

3. The system of claim 1 in which the positive displacement distribution block has means for sequentially feeding the tube outlets each with a positively displaced measured portion of said lubricating fluid.

4. The system of claim 3 in which the positive displacement distribution block has an inlet section, intermediate sections connecting to said feed tubes, and an end section.

5. The system of claim 1 in which said outlet tubes are aligned approximately parallel to adjacent portions of said blade surface.

6. The system of claim 1 in which said feed tubes pass through apertures in said blade surface just above a top portion of said cutting plate.

7. The system of claim 1 in which said storage container contains a lubricating fluid comprising a dilute polymer and a diluting agent comprising water.

8. The system of claim 7 in which said polymer comprises a high molecular weight acrylic polymer.

* * * * *